(12) United States Patent
Suzuki

(10) Patent No.: US 9,375,838 B2
(45) Date of Patent: Jun. 28, 2016

(54) GRIP APPARATUS, CONTROL METHOD FOR THE GRIP APPARATUS, AND ROBOT MANIPULATOR

(71) Applicant: CANON KABUSHIKI KAISHA, Tokyo (JP)

(72) Inventor: Hitoshi Suzuki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/361,602

(22) PCT Filed: Nov. 28, 2012

(86) PCT No.: PCT/JP2012/007630
§ 371 (c)(1),
(2) Date: May 29, 2014

(87) PCT Pub. No.: WO2013/080536
PCT Pub. Date: Jun. 6, 2013

(65) Prior Publication Data
US 2014/0324218 A1    Oct. 30, 2014

(30) Foreign Application Priority Data

Nov. 30, 2011 (JP) ................................. 2011-261695
Nov. 12, 2012 (JP) ................................. 2012-248299

(51) Int. Cl.
*B25J 9/16* (2006.01)
*B25J 13/08* (2006.01)

(52) U.S. Cl.
CPC .............. *B25J 9/1612* (2013.01); *B25J 9/1633* (2013.01); *B25J 13/082* (2013.01)

(58) Field of Classification Search
CPC ...... B25J 9/1612; B25J 9/1633; B25J 13/082; B25J 9/0012; B25J 9/10; B25J 9/1615; B25J 9/1669; B25J 9/1692; B25J 9/1694; B25J 13/02; B25J 13/08–13/085; B25J 13/087; B25J 15/00–15/0004; B25J 15/0028; G05B 19/23; G05B 19/234–19/235; G05B 19/25; G05B 19/295–19/296; G05B 19/31; G05B 19/315–19/316; G05B 19/35; G05B 19/355–19/356; G05B 19/37; G05B 19/375–19/376; G05B 19/401–19/402; G05B 19/406; G05B 21/00–21/02; G05B 2219/39024; G05B 2219/39322; G05B 2219/39323; G05B 2219/39466; G05B 2219/39527; G05B 2219/39528; G05B 2219/39529; G05B 2219/39532; G05B 2219/39535; G05B 2219/40583; G05B 2219/40598; G05B 2219/40606; G05B 2219/40618; G05B 2219/40625; G05B 2219/40563; G05B 2219/40567; B23Q 15/007; B23Q 15/20; Y10S 901/30–901/31; Y10S 901/33–901/34; Y10S 901/46; Y10S 901/50
USPC ................... 700/250, 253, 254, 258, 260; 901/30–31, 33–35, 46, 50; 318/568.16–568.18, 568.21
See application file for complete search history.

(56) References Cited

U.S. PATENT DOCUMENTS

| | | | | |
|---|---|---|---|---|
| 4,621,331 A * | 11/1986 | Iwata | ............................. | 700/260 |
| 4,650,492 A * | 3/1987 | Barkhordar et al. | ............ | 623/24 |
| 4,730,862 A * | 3/1988 | Caen et al. | .................... | 294/207 |
| 5,263,375 A * | 11/1993 | Okada | ...................... | 73/862.042 |
| 5,761,940 A * | 6/1998 | Moore et al. | .................... | 72/19.4 |
| 6,332,636 B1 * | 12/2001 | Cohen et al. | ................ | 294/119.1 |
| 6,622,575 B1 * | 9/2003 | Nagata | ...................... | 73/862.042 |
| 2001/0034947 A1 * | 11/2001 | Nagata | ............................. | 33/503 |
| 2005/0017529 A1 * | 1/2005 | Rogers et al. | ............... | 294/103.1 |
| 2008/0312769 A1 * | 12/2008 | Sato et al. | ...................... | 700/249 |
| 2009/0076657 A1 * | 3/2009 | Tsuboi et al. | .................. | 700/275 |
| 2011/0067504 A1 * | 3/2011 | Koyama et al. | ........... | 73/862.381 |
| 2012/0072131 A1 * | 3/2012 | Ikebe | ............................... | 702/41 |
| 2013/0033053 A1 * | 2/2013 | Wilkinson et al. | ............. | 294/198 |

FOREIGN PATENT DOCUMENTS

| | | | |
|---|---|---|---|
| JP | S60-205327 A | | 10/1985 |
| JP | H05-305506 A | | 11/1993 |
| JP | 2003-236786 A | | 8/2003 |

OTHER PUBLICATIONS

Seiichi Teshigawara et al, Highly sensitive sensor for detection of initial slip and its application in a multi-fingered robot hand, Robotics and Automation (ICRA), 2011 IEEE International Conference on, IEEE, May 9, 2011, pp. 1097-1102.

* cited by examiner

*Primary Examiner* — Bao Long T Nguyen
(74) *Attorney, Agent, or Firm* — Canon USA Inc. IP Division

(57) ABSTRACT

A grip apparatus includes a robot hand including plural fingers and pressure sensitive conductive rubber provided to the finger and configured to output a detection signal equivalent to acting force. The pressure sensitive conductive rubber is covered by a cover member. The grip apparatus also includes a control unit configured to cause the plural fingers to perform an opening or closing operation and compare a detection value based on the detection signal from the pressure sensitive conductive rubber with a threshold to determine whether the robot hand grips the work or releases the work. During a period from a time when the closing operation is started until a time when the fingers contacts the work, the control unit samples the detection signal of the pressure sensitive conductive rubber and sets the threshold as a value higher than a detection value at a time of this sampling.

16 Claims, 9 Drawing Sheets

GRIP APPARATUS, CONTROL METHOD FOR THE GRIP APPARATUS, AND ROBOT MANIPULATOR

TECHNICAL FIELD

The present invention relates to a grip apparatus provided with a grip mechanism including plural fingers, a control method for the grip apparatus, and a robot manipulator, in particular, a grip apparatus configured to determine a grip state of a work by comparing a detection value based on a detection signal obtained from pressure sensitive conductive rubber provided to the finger with a threshold, a control method for the grip apparatus, and a robot manipulator.

BACKGROUND ART

Up to now, a review is made on an apparatus provided with a sensor that is composed of a strain gauge configured to detect whether the work contacts a contact surface that is to be contacted with the work at a leading end of the finger in a grip mechanism (see PTL 1). For a grip control of the grip mechanism utilizing the sensor, a determination on whether the work is gripped or released is generally carried out by using the detection signal from the sensor. To be more specific, by using a previously set threshold, it is determined that the work is gripped in a case where the detection value based on the detection signal obtained from the sensor is higher than the threshold, and it is determined that the work is released in a case where the detection value is lower than the threshold.

On the other hand, some of industrial-use grip mechanisms include a cover member formed of rubber or the like which is provided on the contact surface that is to be contacted with the work at the finger for avoiding a scratch on the work. In this case, the sensor is covered with the cover member, and force caused by the work is set to be transmitted to the sensor via the cover member. With this cover member, while the scratch on the work is avoided, it is possible to improve a life of the sensor.

CITATION LIST

Patent Literature

PTL 1: Japanese Patent Laid-Open No. 5-305506

SUMMARY OF INVENTION

Technical Problem

In recent years, as the above-described sensor, instead of the strain gauge, it is conceivable to use pressure sensitive conductive rubber in which an electric resistance value changes in accordance with the acting force and the detection signal to be output changes on the basis of a change in this electric resistance value. In this case too, the sensor is covered with the cover member to improve the life of the sensor. At that time, in order that very small force can be detected in the sensor, a gap between the sensor and the cover member is not formed. To elaborate, if the gap exists in a structural design, when the work is gripped, since the force is not transmitted to the sensor while the gap is squashed, a high accuracy detection is not carried out. To avoid the formation of the gap between the sensor and the cover member, the cover member may be fixed while being pressed against the sensor, but at that time, a creep phenomenon causing a change in the state over time such as a compression elastic deformation or a stress relaxation occurs in the pressure sensitive conductive rubber.

FIG. 7 is a relational diagram indicating an output of the pressure sensitive conductive rubber with respect to the time and a load applied to the pressure sensitive conductive rubber with respect to the time. FIG. 7 illustrates a detection signal output from the sensor at a time when a certain load is applied on the pressure sensitive conductive rubber while a load is placed. The pressure sensitive conductive rubber is a rubber member containing electric conductors such as metallic particles and has a property where the electric resistance value changes with respect to the load. In the sensor configured to detect force by using the pressure sensitive conductive rubber, as illustrated in FIG. 7, since the deformation based on the compression elastic deformation or the stress relaxation lasts for a long period of time, the creep phenomenon occurs in which the fluctuation continues where the output from the sensor composed of the pressure sensitive conductive rubber increases. Therefore, in a case where the pressure sensitive conductive rubber is covered with the cover member, since the load by the cover member acts on the pressure sensitive conductive rubber, the output of the pressure sensitive conductive rubber fluctuates over time because of the creep phenomenon.

FIG. 8 is a sequence diagram of an operation of the grip apparatus in a case where the output of the pressure sensitive conductive rubber fluctuates with respect to the certain load. As illustrated in FIG. 8, in the sensor provided with the pressure sensitive conductive rubber, to determine a grip state from a sensor output S3, a certain threshold is set. The controller of the sensor detects that the sensor output 3S exceeds or dips below the threshold at a detection timing T3 and performs a presence or absence determination J3 of the work. At this time, even when the grip mechanism releases the work because of the creep phenomenon in the pressure sensitive conductive rubber (=increase in the deformation of the rubber caused by the elapse of the pressurization time), the detection value exceeds the threshold, and an erroneous detection that the work is gripped may occur in some cases.

To avoid this erroneous detection, it is also conceivable to previously set a high value to an extent that the erroneous detection does not occur as the threshold, but a timing at which it is determined that the grip mechanism grips the work may accordingly be delayed since the threshold is set to be high.

In view of the above, the present invention provides a grip apparatus that uses pressure sensitive conductive rubber as a sensor and can stably determine a grip state of a work even when a creep phenomenon occurs in the pressure sensitive conductive rubber, a control method for the grip apparatus, and a robot manipulator.

Solution to Problem

A grip apparatus aimed at solving the above-described problem includes: a grip mechanism including a plurality of fingers;

pressure sensitive conductive rubber that is provided to at least one of the plurality of fingers and configured to output a detection signal corresponding to acting force; a cover member that covers the pressure sensitive conductive rubber; and a control unit configured to cause the plurality of fingers to perform an opening operation or a closing operation and also determine that the grip mechanism grips a work in a case where a detection value based on the detection signal is higher than a threshold and determine that the grip mechanism releases the work in a case where the detection value is lower than the threshold, in which the control unit samples the detection signal of pressure sensitive conductive rubber before the fingers contact the work through the closing operation and sets the threshold as a value higher than the detection value at a time of the sampling.

Advantageous Effects of Invention

According to the aspect of the present invention, since the threshold is set so as to cope with the fluctuation in the detection signal caused by the creep phenomenon of the pressure sensitive conductive rubber, the control unit can stably determine whether the grip mechanism grips or releases the work.

DESCRIPTION OF EMBODIMENTS

Figure 1:
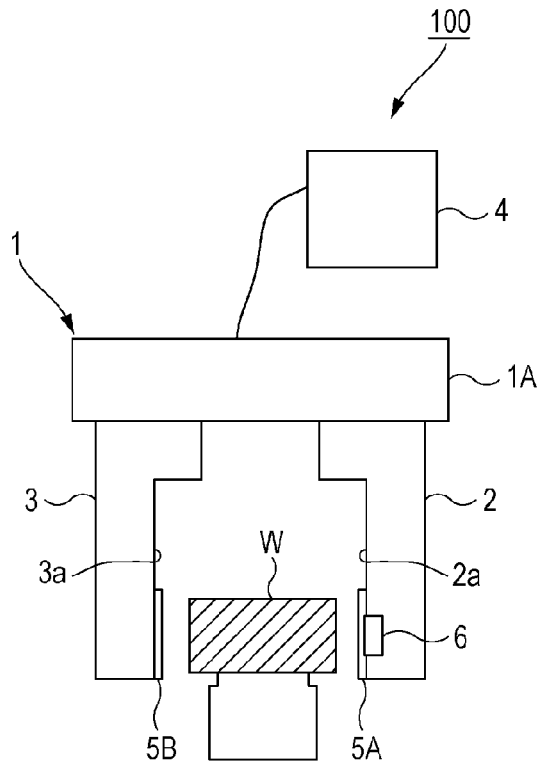
FIG. 1 is an explanatory diagram illustrating an outline configuration of a grip apparatus according to a first exemplary embodiment of the present invention.

Hereinafter, exemplary embodiments of the present invention will be described in detail with reference to the drawings.
First Exemplary Embodiment
FIG. 1 is an explanatory diagram illustrating an outline configuration of a grip apparatus according to a first exemplary embodiment of the present invention. As illustrated in FIG. 1, a grip apparatus 100 is provided with a robot hand 1 as a grip mechanism and a control unit 4 configured to control the robot hand. The robot hand 1 includes plural fingers 2 and 3. The control unit 4 causes the fingers 2 and 3 to perform a closing operation so that it is possible to grip a work W, and causes the fingers 2 and 3 to perform an opening operation so that it is possible to release the grip of the work W. Herein, a state in which the robot hand 1, that is, the fingers 2 and 3, grips the work W refers to a state in which the fingers 2 and 3 grip the work W at a pressure to an extent that the work W does not fall from the fingers 2 and 3.

According to the present first exemplary embodiment, the robot hand 1 includes two fingers composed of the first finger 2 and the second finger 3. The respective fingers 2 and 3 are provided on a base member 1A and include a motor and a reduction gear which are not illustrated in the drawing. The motor is driven while a voltage, a current, a frequency, a duty ratio, and the like are adjusted. With this configuration, the respective fingers 2 and 3 are driven, and the fingers 2 and 3 are moved with respect to the base member 1A so as to be close to each other or away from each other. By causing the fingers 2 and 3 to be close to each other, the work W is gripped, and by causing the fingers 2 and 3 to be away from each other, the grip of the work W is released. Thus, the operations of the first and second fingers 2 and 3 are controlled by the control unit 4.

The grip apparatus 100 is provided with pressure sensitive conductive rubber (sensor) 6 provided to at least one finger among the two fingers 2 and 3, which is, according to the present first exemplary embodiment, the first finger 2. The pressure sensitive conductive rubber 6 is composed of a rubber member containing metallic particles, and an electric resistance value thereof changes in accordance with force acting on the pressure sensitive conductive rubber 6. To be more specific, as the force acting on the pressure sensitive conductive rubber 6 increases, the electric resistance value decreases. The pressure sensitive conductive rubber 6 is provided at a leading end in the finger 2, to elaborate, the contact surface 2a to be contacted by the work W when the work W is gripped in the finger 2.

The grip apparatus 100 is provided with cover members 5A and 5B provided to contact surfaces 2a and 3a of the respective fingers 2 and 3. The respective cover members 5A and 5B are formed of elastic members such as rubber or urethane and used for avoiding the direct contact of the fingers 2 and 3 with the work W when the work W is gripped.

The cover member 5A is provided so as to cover the pressure sensitive conductive rubber 6. With this configuration, the force that acts when the work W is gripped is transmitted to the pressure sensitive conductive rubber 6 via the cover member 5A. Since the force acts on the pressure sensitive conductive rubber 6, the electric resistance value changes, and the output (detection signal) changes because of the change in this electric resistance value. To elaborate, the pressure sensitive conductive rubber 6 outputs the detection signal equivalent to the acting force. The output of the pressure sensitive conductive rubber 6 is taken into the control unit 4. The control unit 4 performs a grip control by utilizing the taken output of the pressure sensitive conductive rubber 6.

In FIG. 1, it is supposed that the work W is installed between the first finger 2 and the second finger 3, and the grip is carried out from an outer side of the work W by the two fingers 2 and 3. It is noted that although not particularly illustrated in the drawing, in a case where the work W has a hollow center, the fingers 2 and 3 may be inserted into a hollow center of the work, and the work may be gripped outwards at back parts of the fingers. In this case too, the pressure sensitive conductive rubber 6 is similarly arranged at a position where the gripped work W can be detected.

Figure 2A:
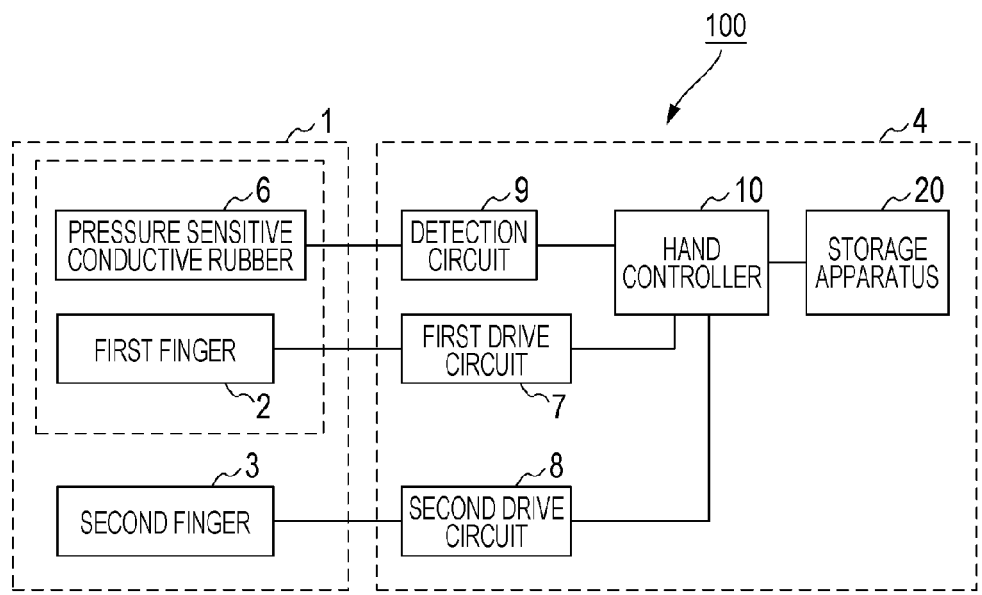
FIG. 2A is a block diagram of a system configuration of the grip apparatus according to the first exemplary embodiment of the present invention.
Figure 2B:
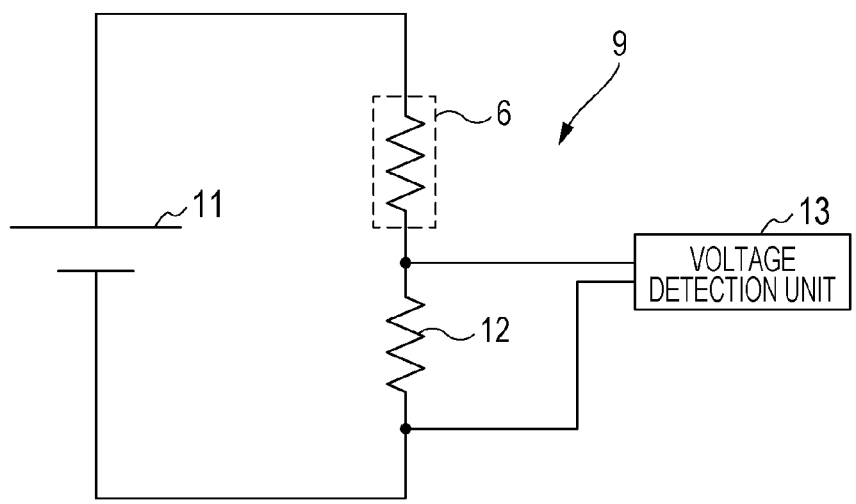
FIG. 2B is a circuit diagram of a detection circuit in a control unit.

FIG. 2A is a block diagram of a system configuration of the grip apparatus 100 according to the first exemplary embodiment of the present invention, and FIG. 2B is a circuit diagram of a detection circuit in the control unit 4. The control unit 4 is composed of a first drive circuit 7 for driving the first finger, a second drive circuit 8 for driving the second finger, a detection circuit 9 configured to detect an output (detection signal) of the pressure sensitive conductive rubber 6, a hand controller 10 configured to control the drive circuits 7 and 8, and a storage apparatus 20 configured to store various pieces of data and the like.

The hand controller 10 outputs control signals to the drive circuits 7 and 8. The drive circuits 7 and 8 receiving the inputs of the control signal then output drive signals to the fingers 2 and 3 to cause the fingers 2 and 3 to perform an opening closing operation. To elaborate, the hand controller 10 causes the drive circuits 7 and 8 to operate for operating the fingers 2 and 3.

The detection circuit 9 is configured to output a detection value based on the detection signal. To specifically describe, as illustrated in FIG. 2B, the detection circuit 9 includes a resistor 12 connected in serial to the pressure sensitive conductive rubber 6 and a DC power supply 11 that applies a voltage to a circuit formed of the pressure sensitive conductive rubber 6 and the resistor 12. The DC power supply 11 applies a certain voltage to the pressure sensitive conductive rubber 6 to cause a current flowing through the pressure sensitive conductive rubber 6. Since this current flows through the resistor 12, a voltage that is proportional to the current is generated in the resistor 12. Also, the detection circuit 9 includes a voltage detection unit 13 configured to detect a potential difference at both ends of the resistor 12 and output a detected voltage value as a detection value.

To elaborate, in the pressure sensitive conductive rubber 6, the electric resistance value changes in accordance with the acting force, and according to this, the current flowing through the pressure sensitive conductive rubber 6 changes. Since the current indicated by this detection signal flows through the resistor 12, the voltage that is proportional to the current is generated between terminals of the resistor 12, and the voltage value of this voltage is detected by the voltage detection unit 13 as a detection value. The voltage value as the detection value detected by the voltage detection unit 13 is transmitted to the hand controller 10. This voltage value corresponds to the force acting on the pressure sensitive conductive rubber 6. To elaborate, as the force acting on the pressure sensitive conductive rubber 6 is higher, the voltage value as the detection value is higher.

The hand controller 10 takes in the signal indicating the voltage value (detection value) from the detection circuit 9 and controls the drive circuits 7 and 8 to carry out the grip operation. To be more specific, the hand controller 10 is provided with a micro controller, a DSP, and the like and can perform a digital conversion on the signal indicating the voltage value (detection value) by an A/D converter to be taken in. The taken voltage value (detection value) can be saved in a RAM, a flash, or the like which is not illustrated in the drawing.

The storage apparatus 20 stores a program, and the hand controller 10 operates in accordance with the program stored in the storage apparatus 20.

In a case where the taken detection value is higher than a threshold, the hand controller 10 determines that the robot hand 1 grips the work W, and in a case where the detection value is lower than the threshold, the hand controller 10 determines that the robot hand 1 releases the work W. It is noted that in a case where the detection value is the same as the threshold, the hand controller 10 may determine that the work W is gripped or determine that the work W is released. Subsequently, the hand controller 10 causes the first and second fingers 2 and 3 to perform an intended operation by using the determination result, so that it is possible to certainly grip and release the work W.

It is noted that although not particularly illustrated in the drawing, if a superior controller is prepared, a controller that performs a motor control may not be the same as a controller that performs a sensor control. The control may be carried out while mutually individual controllers for the motor control and for the sensor control are provided and connected to the superior controller by a general information transmission unit such as a serial or CAN communication. With this configuration, even in a case where the size of the grip apparatus is enlarged, the superior controller controls operations with respect to the respective controllers. By preparing the superior controller, the respective controllers can be dispersed.

Incidentally, if a gap exists between the cover member 5A and the pressure sensitive conductive rubber 6, the output (detection signal) hardly changes while the gap is squashed, and it is difficult to detect very small force. For that reason, according to the present first exemplary embodiment, the cover member 5A is fixed to the finger 2 in a state of being pressed into contact with the pressure sensitive conductive rubber 6 so as not to create the gap. In this manner, since the cover member 5A is pressed against the pressure sensitive conductive rubber 6, the creep phenomenon occurs in the pressure sensitive conductive rubber 6, and the output (detection signal) of the pressure sensitive conductive rubber 6 fluctuates. This arises from the state change over time that is specific to rubber such as the compression elastic deformation or the stress relaxation. Therefore, it is important to suppress the influence of the output fluctuation of the pressure sensitive conductive rubber 6 caused by the creep phenomenon as much as possible.

Figure 3:
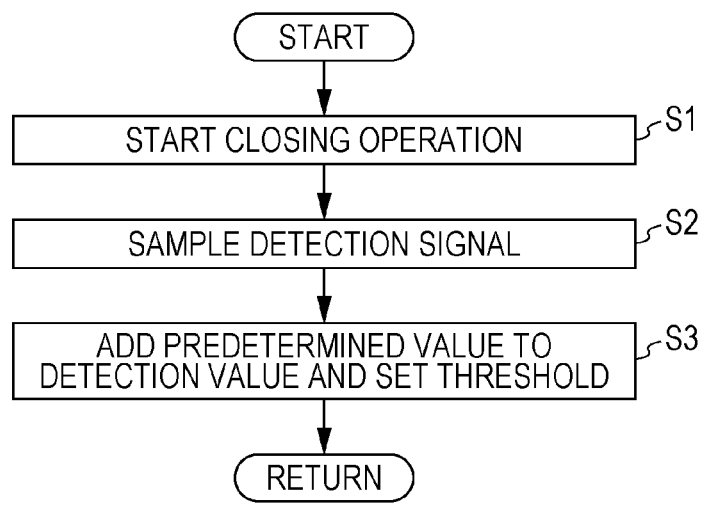
FIG. 3 is a flow chart of a threshold setting operation by a controller according to the first exemplary embodiment of the present invention.
Figure 4:
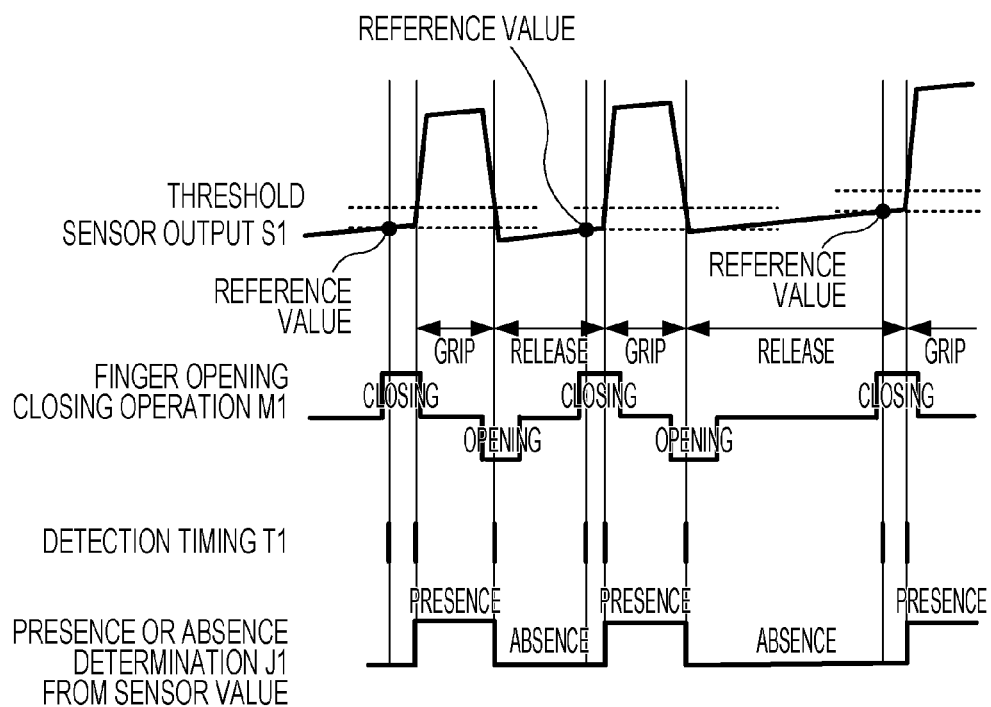
FIG. 4 is a sequence diagram of a grip operation/grip release operation by the grip apparatus according to the first exemplary embodiment of the present invention.

FIG. 3 is a flow chart of a threshold setting operation by the hand controller 10 that operates in accordance with a program. FIG. 4 is a sequence diagram of a grip operation/grip release operation by the grip apparatus 100. A horizontal axis in FIG. 4 represents an elapse of time, and operations by the respective units are illustrated.

In accordance with the program, as illustrated in FIG. 4, the hand controller 10 outputs a control signal indicating an opening closing operation M1 for opening and closing the fingers 2 and 3 to the respective drive circuits 7 and 8 to cause the fingers 2 and 3 to perform the opening closing operation. It is noted that in FIG. 4, a height at the opening closing operation M1 indicates a speed of the opening closing operation. As the height is higher, the operation is faster. The opening operation is represented in a positive direction (upward direction), and the closing operation is represented in a negative direction (downward). Subsequently, the hand controller 10 detects a detection timing T1 at which a detection value based on an output S1 (detection signal) from the pressure sensitive conductive rubber 6 functioning as the sensor becomes at the threshold, and according to this, a presence or absence determination J1 of the work W is carried out.

According to the present first exemplary embodiment, the hand controller 10 is configured to change the setting on the threshold each time the closing operation by the fingers 2 and 3 is carried out. As illustrated in FIG. 3, first, the hand controller 10 of the control unit 4 outputs control signals to the respective drive circuits 7 and 8 to cause the fingers 2 and 3 to start the closing operation, and the fingers 2 and 3 start the closing operation by the drive circuits 7 and 8 (S1). Next, the hand controller 10 inputs a detection value (voltage value)

detected when a detection signal of the pressure sensitive conductive rubber 6 is sampled by the detection circuit 9 from the detection circuit 9 during a period from a time when the fingers 2 and 3 start the closing operation to a time when the fingers 2 and 3 contact the work W (S2).

Next, the hand controller 10 sets the detection value obtained at the time of this sampling as a reference value as illustrated in FIG. 4 and sets a result obtained by adding a predetermined value that is previously set to this reference value as a threshold (S3). Herein, the predetermined value is a positive value previously stored in the storage apparatus 20, the hand controller 10 reads out data on the predetermined value from the storage apparatus 20 to be added to the reference value to set the threshold. With this configuration, the threshold is set as a value higher than the detection value (reference value).

According to the present first exemplary embodiment, at a time point or immediately after a time when the hand controller 10 outputs the control signals for carrying out the opening operation to the drive circuits 7 and 8, in other words, at a time point or immediately after a time when the fingers 2 and 3 are caused to perform the closing operation, the detection value is taken in as the reference value to obtain the threshold.

As described above, according to the present first exemplary embodiment, since the threshold is set while corresponding to the fluctuation of the detection signal caused by the creep phenomenon of the pressure sensitive conductive rubber 6, the control unit 4 can stably determine that the robot hand 1 grips or releases the work W.

Also, since the computation processing for setting the threshold is faster than the mechanical operation by the fingers 2 and 3, in the case of a time before the fingers 2 and 3 grips the work W, even after the control signal indicating the closing operation is transmitted, the threshold can be obtained. To elaborate, the detection value may be sampled during a period from a time when the fingers 2 and 3 start the closing operation to a time when the fingers 2 and 3 contact the work W. In particular, if the detection value is sampled at a time point or immediately after the fingers 2 and 3 are caused to start the closing operation, the threshold can be set more stably before the fingers 2 and 3 grip the work W. With this configuration, the threshold is set in advance before the fingers 2 and 3 actually grip the work W. Since a timing at which the detection value corresponding to the reference value is sampled is close to a timing at which the fingers 2 and 3 grip the work W, it is possible to determine the grip or release of the work W more accurately.

It is noted that the value to be added to the reference value as the threshold may be fixed, or the value to be added to the reference value may individually be changed depending of a shape of the work W or a setting grip force. If the value added to the reference value is fixed, for example, even when different works W exist, the grip setting can be facilitated. If the value added to the reference value is individually set depending on the work W, an optimal grip control of the work W can be carried out, and for example, a total optimization such as shortening of a duct can be realized in a process where the robot hand 1 is used.

Second Exemplary Embodiment

Next, an operation by a grip apparatus according to a second exemplary embodiment of the present invention will be described. It is noted that the configuration of the grip apparatus according to the present second exemplary embodiment is similar to the grip apparatus according to the first exemplary embodiment described above by using FIG. 1 and FIG. 2, and a detailed description will be omitted.

Figure 5:
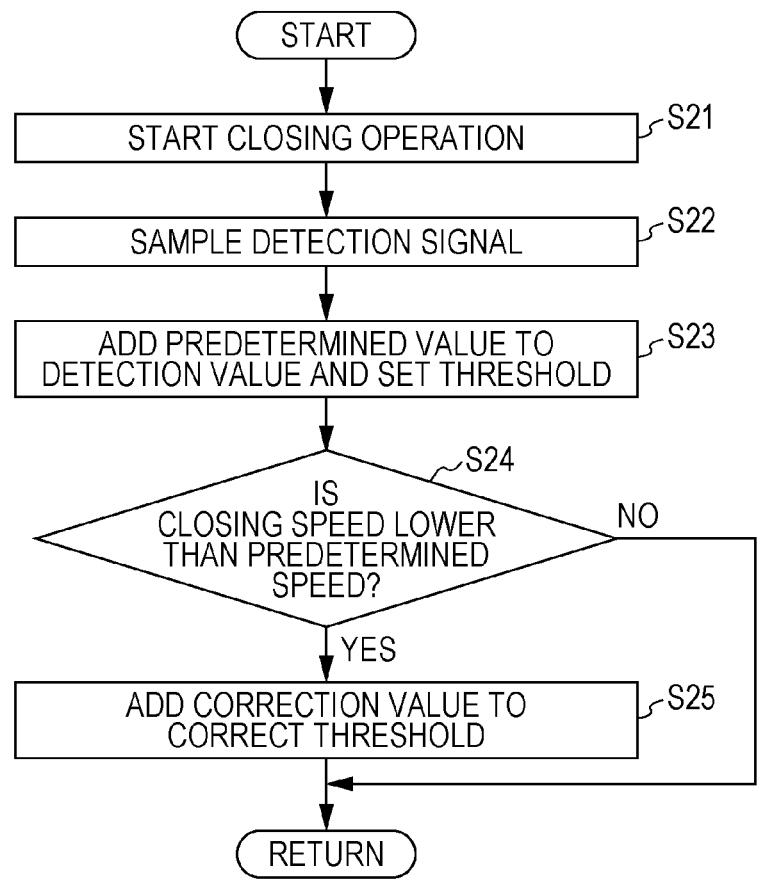
FIG. 5 is a flow chart of a threshold setting operation by the controller of the control unit according to a second exemplary embodiment of the present invention.
Figure 6:
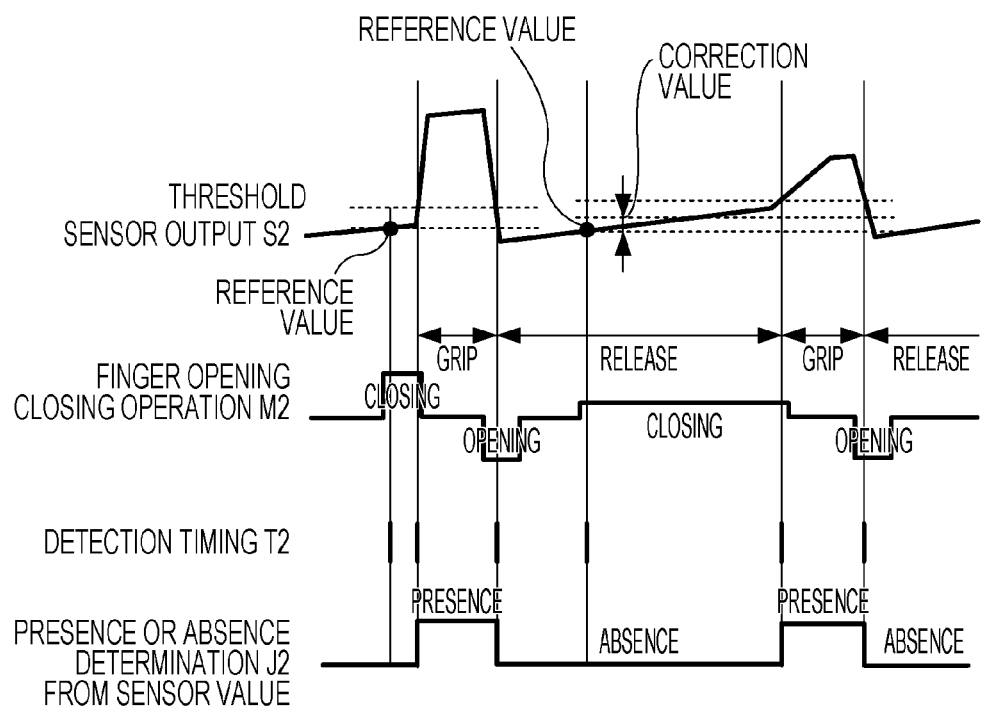
FIG. 6 is a sequence diagram of a grip operation/grip release operation by the grip apparatus according to the second exemplary embodiment of the present invention.
Figure 7:
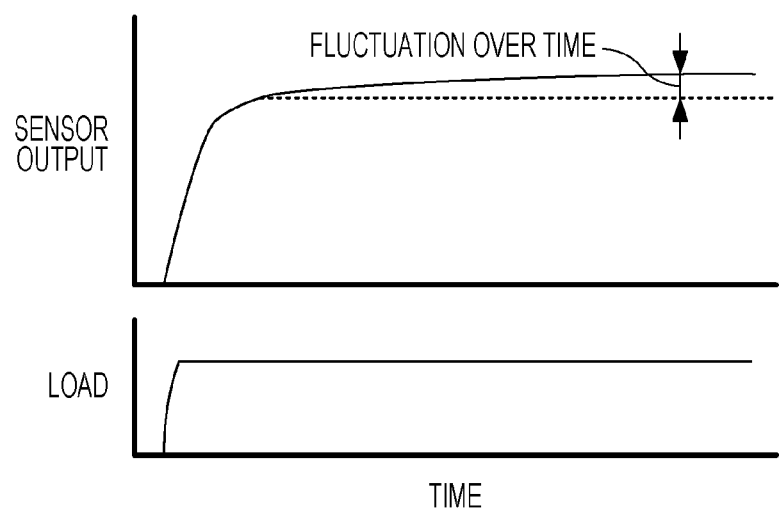
FIG. 7 is a relational diagram indicating an output of the pressure sensitive conductive rubber with respect to the time and a load applied to the pressure sensitive conductive rubber with respect to the time.
Figure 8:
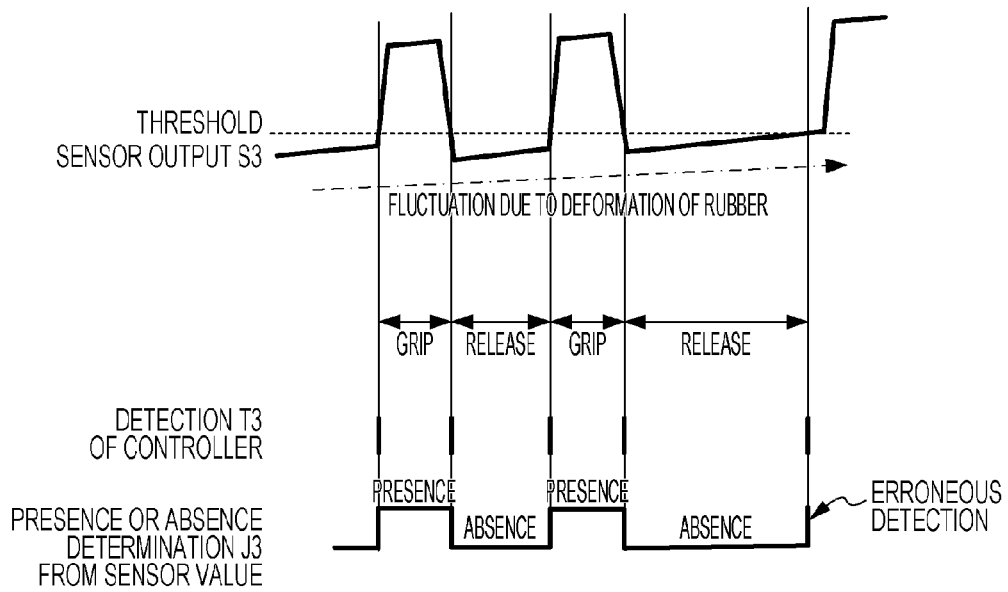
FIG. 8 is a sequence diagram of an operation of the grip apparatus in a case where the output of the pressure sensitive conductive rubber fluctuates with respect to a certain load.

FIG. 5 is a flow chart of a threshold setting operation by the hand controller 10 of the control unit 4. FIG. 6 is a sequence diagram of a grip operation/grip release operation by the grip apparatus 100. A horizontal axis represents an elapse of time, and operations by the respective units are illustrated.

Some works W to be gripped by the robot hand 1 are fragile. In a case where the work W is fragile, to grip the work W by adjusting very small force while avoiding a destruction, a gripping speed, that is, a speed (closing speed) of the closing operation by the fingers 2 and 3 is set to be lower than the predetermined speed in some cases. By setting the gripping speed to be low, a movement distance with respect to the time is low, and it is possible to avoid a displacement of the fingers 2 and 3 due to a response delay. That is, it is possible to adjust the very small force. As a method of setting the gripping speed to be low, for example, a general motor control method may be adopted. In the case of a voltage control, a control voltage is set to be low, for example.

As illustrated in FIG. 6, the hand controller 10 outputs controls signals indicating an opening closing operation M2 for opening and closing the fingers 2 and 3 to the respective drive circuits 7 and 8 to cause the fingers 2 and 3 to perform the opening closing operation. It is noted that in FIG. 6, a height at the opening closing operation M2 indicates a speed of the opening closing operation. As the height is higher, the operation is faster. The opening operation is represented in a positive direction (upward direction), and the closing operation is represented in a negative direction (downward). Subsequently, the hand controller 10 detects a detection timing T2 at which a detection value based on an output S2 (detection signal) from the pressure sensitive conductive rubber 6 serving as the sensor becomes the threshold, and according to this, a presence or absence determination J2 of the work W is carried out.

According to the present second exemplary embodiment the hand controller 10 is configured to change the setting on the threshold each time the closing operation by the fingers 2 and 3 is carried out. As illustrated in FIG. 5, first, the hand controller 10 of the control unit 4 outputs control signals to the respective drive circuits 7 and 8 to cause the fingers 2 and 3 to start the closing operation, and the fingers 2 and 3 start the closing operation by the drive circuits 7 and 8 (S21). Next, the hand controller 10 inputs a detection value (voltage value) detected when the detection signal of the pressure sensitive conductive rubber 6 is sampled by the detection circuit 9 from the detection circuit 9 during a period from a time when the fingers 2 and 3 start the closing operation to a time when the fingers 2 and 3 contact the work W (S22).

Next, the hand controller 10 sets the detection value obtained at the time of this sampling as a reference value as illustrated in FIG. 6 and sets a result obtained by adding a predetermined value that is previously set to this reference value as a threshold (S23). Herein, the predetermined value is a positive value previously stored in the storage apparatus 20, the hand controller 10 reads out data on the predetermined value from the storage apparatus 20 to be added to the reference value to set the threshold. With this configuration, the threshold is set as a value higher than the detection value (reference value).

Next, the hand controller 10 determines whether or not the closing speed of the fingers 2 and 3 is lower than the previously set predetermined speed (S24). In a case where the closing speed of the fingers 2 and 3 is higher than the predetermined speed (S24: No), the hand controller 10 does not correct the threshold.

In S24, in a case where it is determined that the closing speed of the fingers 2 and 3 is lower than the predetermined speed (S24: Yes), the hand controller 10 corrects the threshold to be higher than a value at a time when the closing speed is higher than the predetermined speed (S25).

In a case where the threshold is set while the detection value taken in at the start point or immediately after the start of the closing operation by the fingers 2 and 3 is set as the reference value, a period of time from the actual contact of the work W with the fingers 2 and 3 until the completion of the grip at a predetermined pressure is longer as the closing speed is lower. A period of time from a time point when the threshold is set until a time when the work W contacts the fingers 2 and 3 to complete the grip is long, an influence of the state change over time that is specific to rubber is larger. In view of the above, according to the present second exemplary embodiment, the hand controller 10 corrects the threshold by adding a positive value to the correction value in S25. The correction value is set as a value that becomes higher as the grip speed (closing speed) is lower.

Herein, in a case where the grip is carried out by the robot hand 1 in the actual procedure, since the material and the shape of the work W are already identified, a manner of gripping the work W is previously decided. On the basis of the information, teaching is conducted for the robot by using a teaching pendant or the like. In the fragile work W, the setting is made in a manner that the grip is carried out by setting the closing speed of the fingers 2 and 3 to be lower than the predetermined speed on the basis of the advance information. The closing speed of the fingers 2 and 3 is already identified (to elaborate, the closing speed is stored in the storage apparatus 20). The hand controller 10 obtains a distance between the finger 2 and the work W at a time point when the detection value is sampled, and a time at which the finger 2 contacts the work W is obtained from the obtained distance. With respect to the obtained time, the used correction value is obtained depending on how much the correction is to be carried out.

The correction value is obtained as a correction table through a previous review on a correlativity between the correction value and the contact time counted from the time point when the detection value is sampled until the finger 2 contacts the work in a mechanism where a pressure is applied to the pressure sensitive conductive rubber 6 built in the finger 2 by the cover member 5A. The correction table where the contact time is associated with the correction value is previously stored in the storage apparatus 20. Subsequently, in S25, the hand controller 10 obtains the time counted from the time point when the detection value is sampled until the finger 2 contacts the work. The correction value corresponding to the obtained time is obtained through a reference to the correction table to perform the correction on the threshold.

In this manner, since the correction on the threshold is carried out while the time change expected for the finger 2 to contact the work W is taken into account, it is possible to conduct the more accurate grip determination.

As described above, according to the present second exemplary embodiment, an effect similar to the above-described first exemplary embodiment is realized, and also even when the grip speed is changed in accordance with the fragility of the work W, the threshold can be corrected. Thus, it is possible to determine the grip/grip release more accurately.

According to the above-described embodiment, the case has been described in which the detection circuit of the control unit applies the voltage to the pressure sensitive conductive rubber by the DC power supply, and the voltage value of the voltage between the terminals of the resistor which is in proportion to the current is detected as the detection value on the basis of the current serving as the detection signal that is obtained from the pressure sensitive conductive rubber, but the embodiment is not limited to this case. The current value may be detected on the basis of the current serving as the detection signal as the detection value.

In addition, according to the above-described embodiment, the case has been described in which the detection circuit and the controller are separate parts in the control section, but the embodiment may includes a case in which the controller includes a part or all of the detection circuit. Also, the case has been described in which the A/D converter that performs the A/D conversion is included in the controller, but the A/D converter may be separately prepared from the controller, and also the A/D converter may be included in the detection circuit.

In addition, according to the above-described embodiment, the case has been described in which the robot hand includes the two fingers, but the embodiment may includes a case in which the robot hand includes three or more fingers.

In addition, the case has been described in which the pressure sensitive conductive rubber is provided to one finger, but the pressure sensitive conductive rubber may be provided to two or more fingers. Also, the case has been described in which the finger is a jointless finger, but the finger may include a joint.

Furthermore, according to the above-described embodiment, the case has been described in which the storage apparatus is separated from the controller, but the storage apparatus may be built in the controller.

Third Exemplary Embodiment

Figure 9:
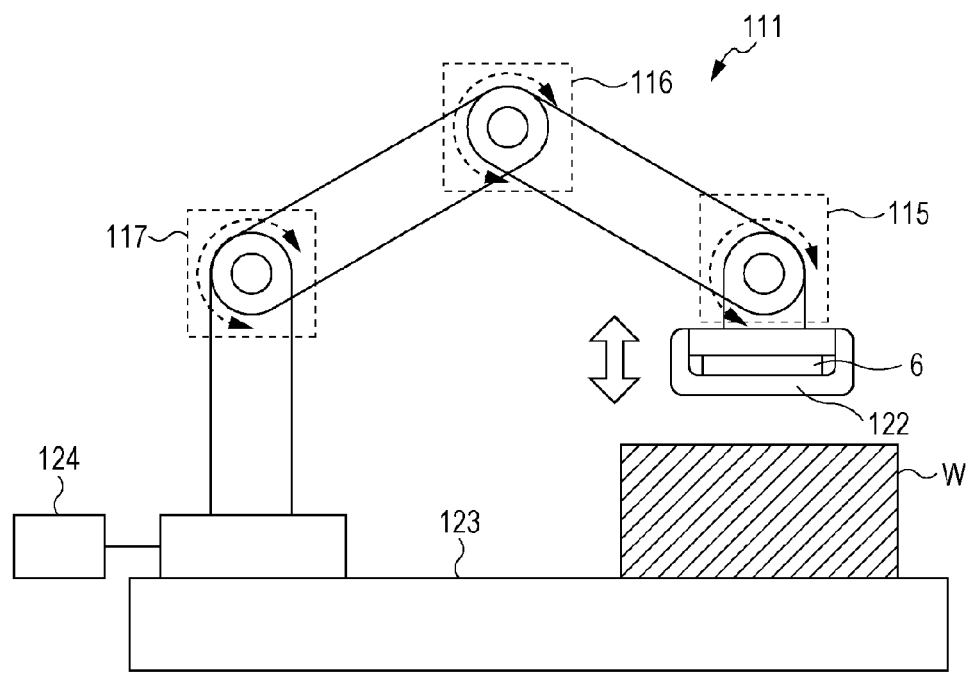
FIG. 9 is a schematic diagram of a configuration of a robot arm according to an embodiment of the present invention.

FIG. 9 is a schematic diagram of a configuration of a robot arm according to an embodiment of the present invention, illustrating a robot arm 111, first to third drive shafts 115, 116, and 117, the work W, the sensor 6, an elastic member 122, a work access platform 123, and an arm controller 124. According to the present exemplary embodiment, the robot arm 111 is composed of three shafts, and the sensor 6 is arranged on the robot arm 111. FIG. 9 is an explanatory diagram for describing a state in which the sensor 6 is mounted to the leading end of the robot arm 111 and the work W is fixed from the above. Herein, the sensor 6 is covered with the elastic member 122 at an arm leading end. The robot arm 111 is controlled by the arm controller 124 to carry out a contact detection with respect to the work W. By pressing the work W by the robot arm 111, the work can be fixed, and a touch operation or the like can be carried out.

In the robot arm 111, the sensor 6 is arranged at a position where the work W can be detected, and the output of the sensor 6 is taken in by the arm controller 124. The taken output of the sensor 6 is utilized to carry out the arm control.

Figure 10:
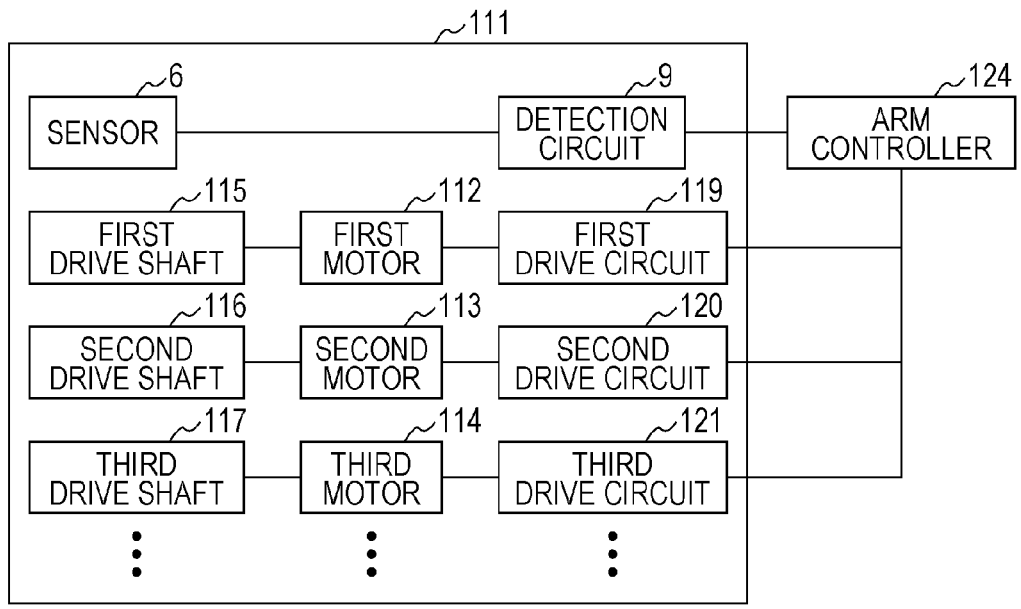
FIG. 10 is a block diagram of a system configuration of a robot arm control apparatus according to the embodiment of the present invention.

FIG. 10 is a block diagram of a system configuration of a robot arm control apparatus according to the embodiment of the present invention. The robot arm 111 is composed of three shafts, and the arm controller 124 controls first to third motors 112, 113, and 114, the first to third drive shafts 115, 116, and 117, drive circuits 119, 120, and 121, the detection circuit 9 that detects the output of the sensor 6, the robot arm 111, and the sensor 6. The robot arm 111 is composed of the three shafts. In the robot arm 111, the drive circuits 119, 120, and 121 operate on the basis of control signals from the arm controller 124. The robot arm 111 operates while drive signals are transmitted from the controlled drive circuits 119, 120, and 121. The robot arm 111 is structured by a general combination including reduction gears as well as the motors 112, 113, and 114, the drive shafts 115, 116, and 117, and the like to be driven. A drive method is based on a general drive unit such as a voltage, a current, a frequency, a duty ratio, and the like. Also, herein, the case has been described in which the robot arm 111 is composed of a vertical articulated arm including plural shafts, but an orthogonal robot operating horizontally or vertically can also be used similarly.

The following effect can be obtained while the operation by the robot arm 111 is carried out on the basis of the output of the sensor 6. For example, in a case where the work W is fixed in the configuration according to the present exemplary embodiment, the arm approaches the work W on a shortest path. The output of the sensor 6 is detected to hold the state, and the work W is fixed. If the detection by the sensor 6 is continuously carried out, a position of the robot arm 111 can be changed by controlling other shafts while it is confirmed that the fixation of the work W at a leading end part of the robot arm 111 is realized. That is, in actuality, another robot arm (not illustrated) operates with respect to the fixed work W, but the operation can be freely conducted while an interference region at the time of the operation by the other robot arm is reduced. Also, it is possible to change the position in advance as a preparation for a shift to the next operation while the work is fixed. Since the operation efficiency is improved by widening the operation region of the other adjacent robot arm, an effect such as a reduction in the total operation time can be obtained.

Figure 11:
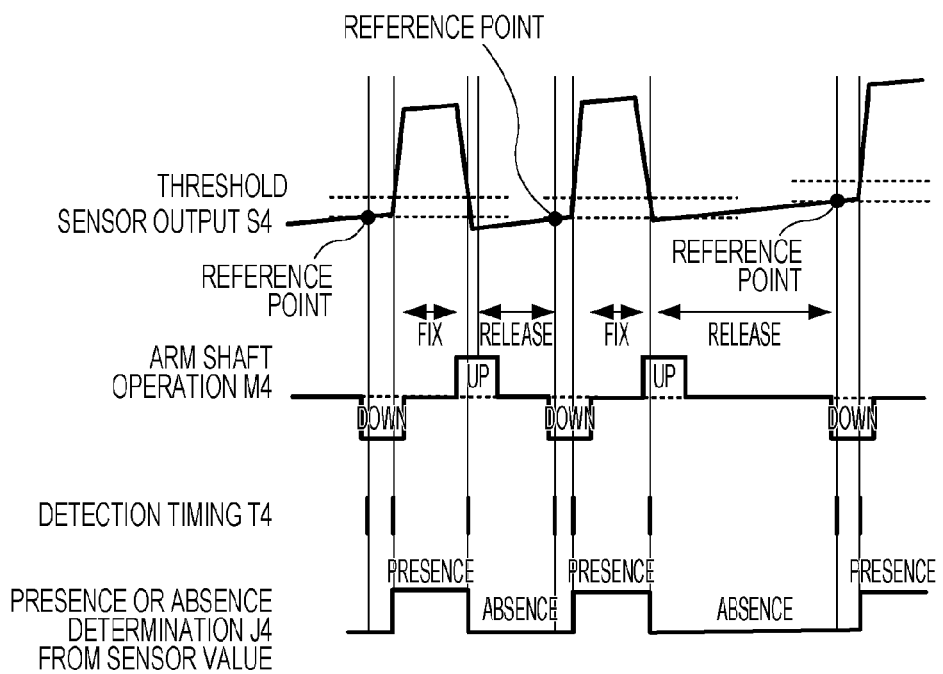
FIG. 11 illustrates an operation sequence of the robot arm.

FIG. 11 illustrates an operation sequence of the robot arm according to the present exemplary embodiment. A horizontal axis represents an elapse of time, and operations by the respective units are illustrated. An output S4 of the sensor 6 of FIG. 11 represents a state of an output where the work W contacts the sensor 6 on which force is applied during the operation of the robot arm 111. An arm operation M5 represents a speed of the operation by the robot arm 111, and as the speed is higher, the operation is faster. Herein, the description has been made by using the speed of the leading end of the robot arm 111 to which the sensor 6 is mounted, and the operating direction is upward and downward with respect to the work W. A detection timing T4 and a presence or absence determination J4 schematically represent a timing at which the work W is detected and a state in which the presence or absence of the work W is determined on the basis of the information obtained at the detection timing in the arm controller 124.

According to the present exemplary embodiment, when the arm control is carried out, a reference point is created on the basis of the signal of the arm operation M5, and the output S5 of the sensor 6 at the reference point is taken in, so that the threshold is arbitrary set on the basis of this output. The arm operation M5 has been described by using the speed at the leading end of the robot arm 111, but in the case of the vertical articulated robot, the speed at the leading end of the robot arm 111 id decided on the basis of rotation speeds of the respective drive shafts and a combination thereof. In a case where the reference point is created from the arm operation, an operation signal of any one of the drive shafts may be used so long as the drive shafts operate when the work W is fixed. For example, if the operation signal of the drive shaft operating immediately before the work W is detected is set as the reference, since a time difference between the reference point and the detection timing is small, the fluctuation in the output of the sensor 6 can be minimized It is general to mount the robot hand to the robot arm 111 for the operation. According to the present exemplary embodiment, since the sensor 6 is directly mounted to the robot arm 111 to perform the detection for the operation without the mounting of the hand, the cost related to the hand can be reduced.

Fourth Exemplary Embodiment

A schematic diagram of a configuration of the robot arm control apparatus according to the present exemplary embodiment and a system configuration are similar to those of the third exemplary embodiment.

Figure 12:
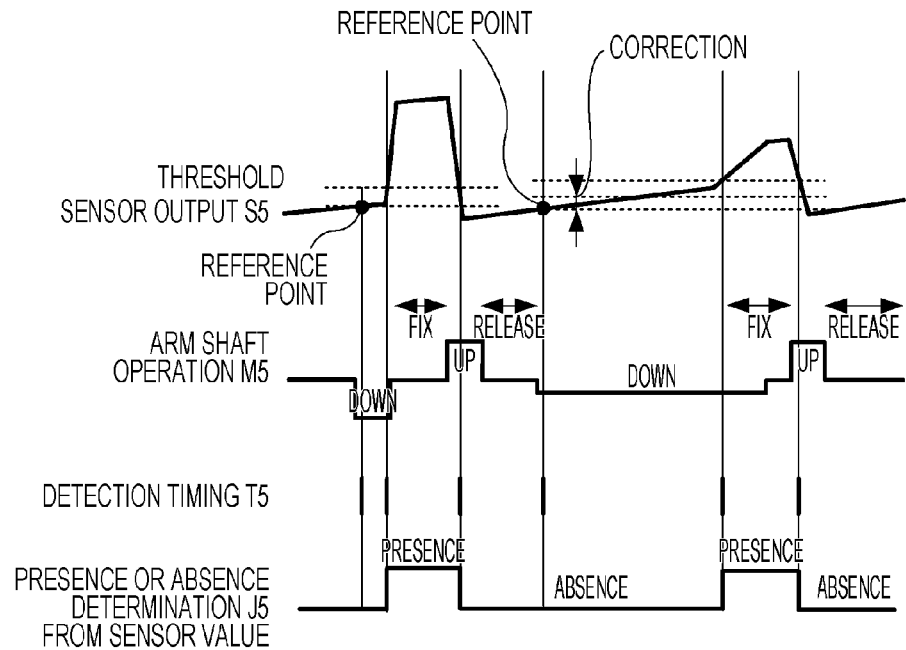
FIG. 12 illustrates the operation sequence of the robot arm.

FIG. 12 illustrates the operation sequence of the robot arm. An operation sequence of FIG. 12 is similar to the description on the robot arm illustrated in FIG. 9.

According to the present exemplary embodiment, the operation by the robot arm 111 in a case where the fragile work W is fixed is illustrated. For example, in a case where the work W is fragile, since the detection is conducted by adjusting very small force so as not to break the work W, the operation speed of the robot arm 111 may be reduced in some cases. By reducing the operation speed, the movement distance with respect to the time is decreased, so that it is possible to avoid the displacement of the robot arm 111 caused by the response delay. That is, it is possible to adjust the very small force.

In a case where the operation by the robot arm 111 is slow, an erroneous detection may be caused because of the shift in the signal of the sensor 6 similarly as in the second exemplary embodiment.

According to the present exemplary embodiment, the setting on the threshold is conducted after the output of the sensor 6 taken in at the reference point in accordance with the operation speed set by the arm controller 124 is corrected.

In the general actual procedure, in a case where the operation is conducted by using the robot arm 111, since the material and the shape of the work W are already identified, a manner of gripping the work W is previously decided. On the basis of the information, teaching is conducted for the robot by using a teaching pendant (not illustrated) or the like. For the operation by the robot arm 111, since a distance between the leading end position of the robot arm 111 and the work access platform 123 can regularly be calculated, the movement is conducted by adjusting the height to the position based on the information on the fixed work W. By creating the correction table based on the operation speed by the robot arm 111, the output value of the sensor 6 is corrected similarly as in the second exemplary embodiment.

Since the correction is carried out while a time change expected for the work W to make the contact is taken into account for the output of the sensor 6 at the reference point, the detailed threshold can be set, so that it is possible to conduct the more accurate operation detection.

Fifth Exemplary Embodiment

A schematic diagram of a configuration of the robot hand and the robot arm control apparatus according to the present exemplary embodiment and a system configuration are similar to those of the first to fourth exemplary embodiment.

Figure 13:
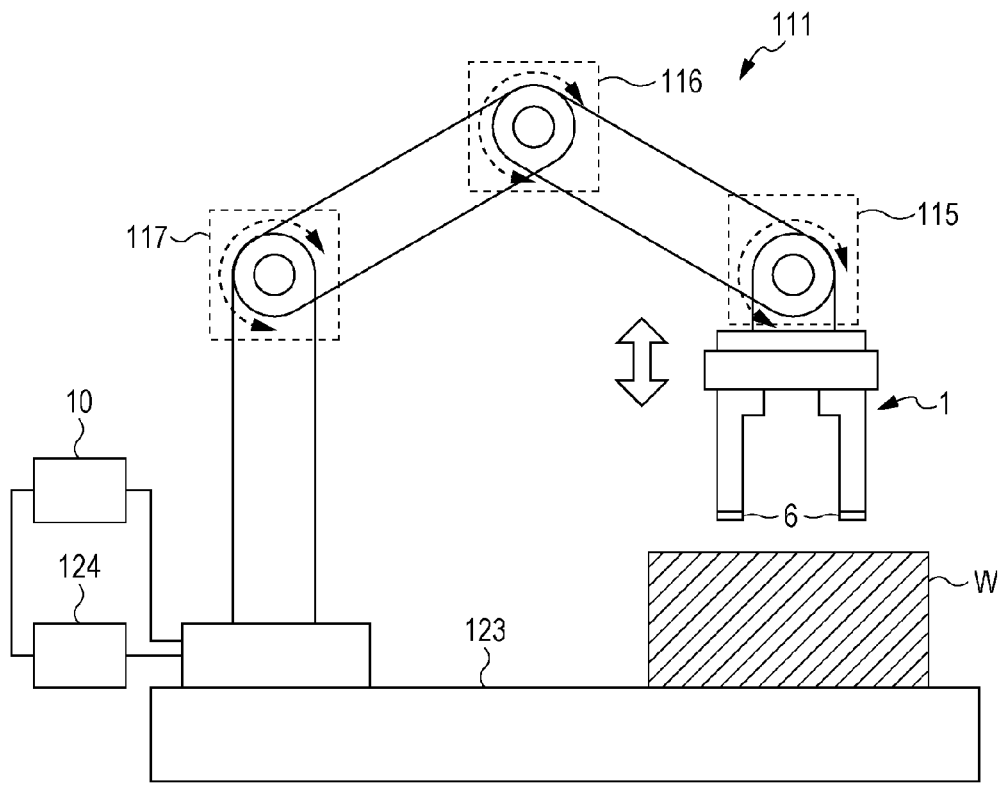
FIG. 13 is a schematic diagram of a configuration of a robot manipulator according to an embodiment of the present invention.

FIG. 13 is a schematic diagram of a configuration of a robot manipulator constituted by joining the robot hand to the robot arm according to an embodiment of the present invention, illustrating the robot hand 1, the first and second fingers 2 and 3, the work W, the sensor 6, the robot arm 111, the first to third drive shafts 15, 16, and 17, the work access platform 123, and the arm controller 124. The robot arm 111 is composed of three shafts, and the sensor 6 is arranged on the robot hand 1. Herein, the sensors 6 are arranged at the leading ends of the first and second fingers 2 and 3 to detect a state of the work W.

The outputs of the sensors 6 mounted to the first and second fingers 2 and 3 on the robot hand 1 are taken into the hand controller 10, and the robot arm 111 is operated by the arm controller 124 to perform the operation. For a communication between the hand controller 10 and the arm controller 124, a superior controller (not illustrated) may be separately prepared, or a direct communication may be carried out. When the apparatus is constructed by a combination of the robot hand and the arm, by attaching the sensor at a position used for the procedure, it is possible to realize the grip and conveyance of the work, the fixation of the work, and the like can be realized by the single apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-261695, filed Nov. 30, 2011 and No. 2012-248299 filed Nov. 12, 2012, which is hereby incorporated by reference herein in its entirety.

REFERENCE SIGNS LIST

1 Robot hand (grip mechanism)
2, 3 Finger
4 Control unit
5A Cover member
6 Pressure sensitive conductive rubber
100 Grip apparatus
111 Robot arm
112 First motor
113 Second motor
114 Third motor
115 First drive shaft
116 Second drive shaft
117 Third drive shaft
119 First drive circuit
120 Second drive circuit
121 Third drive circuit
122 Elastic member
123 Work access platform
124 Arm controller
W Work

The invention claimed is:

1. A grip apparatus comprising:
a grip mechanism including a plurality of fingers;
a pressure sensitive conductive rubber that is provided to at least one of the plurality of fingers and configured to output a detection signal corresponding to acting force; and
a control unit configured to cause the plurality of fingers to perform an opening operation after performing a closing operation and to perform a closing operation after the opening operation, and also configured to determine that the grip mechanism grips a work in a case where a detection value based on the detection signal is higher than a threshold and determine that the grip mechanism releases the work in a case where the detection value is lower than the threshold,
wherein the control unit samples the detection signal of the pressure sensitive conductive rubber before the fingers contact the work and after the opening operation, and sets a value obtained by adding a predetermined value to the detection value based on the sampled detection signal as the threshold.

2. The grip apparatus according to claim 1, wherein the sampling is conducted at a time after the closing operation by the fingers is started but before the fingers contact the work.

3. The grip apparatus according to claim 1, wherein in a case where a speed of the closing operation is lower than a predetermined speed, the control unit corrects the threshold to be higher than a value at a time when the closing speed is higher than the predetermined speed.

4. A robot manipulator comprising the grip apparatus according to any one of claim 1 and a robot arm.

5. A control method for a grip apparatus that includes a grip mechanism including a plurality of fingers, a pressure sensitive conductive rubber that is provided to at least one of the plurality of fingers and configured to output a detection signal corresponding to acting force, and a control unit configured to cause the plurality of fingers to perform an opening operation after performing a closing operation and to perform a closing operation after the opening operation, and also configured to determine that the grip mechanism grips a work in a case where a detection value based on the detection signal is higher than a threshold and determine that the grip mechanism releases the work in a case where the detection value is lower than the threshold, the method comprising:
executing a sampling of the detection signal of the pressure sensitive conductive rubber before the fingers contact the work after the opening operation; and
setting a value obtained by adding a predetermined value to the detection value based on the sampled detection signal as the threshold.

6. The control method for the grip apparatus according to claim 5, wherein the sampling of the detection signal is conducted at a time after the closing operation by the fingers is started but before the fingers contact the work.

7. The control method for the grip apparatus according to claim 5, wherein in a case where a speed of the closing operation is lower than a predetermined speed, the control unit corrects the threshold to be higher than a value at a time when the closing speed is higher than the predetermined speed.

8. A grip apparatus comprising:
a grip mechanism including a plurality of fingers;
a sensor that is provided to at least one of the plurality of fingers and configured to output a detection signal corresponding to acting force;
a cover member that covers the sensor; and
a control unit configured to cause the plurality of fingers to perform an opening operation after performing a closing operation and to perform a closing operation after the opening operation, and also configured to determine that the grip mechanism grips a work in a case where a detection value based on the detection signal is higher than a threshold and determine that the grip mechanism releases the work in a case where the detection value is lower than the threshold,
wherein the control unit samples the detection signal of the sensor before the fingers contact the work and after the opening operation, and sets a value obtained by adding a predetermined value to the detection value based on the sampled detection signal as the threshold.

9. The grip apparatus according to claim 8, wherein the sampling is conducted at a time after the closing operation by the fingers is started but before the fingers contact the work.

10. The grip apparatus according to claim 8, wherein in a case where a speed of the closing operation is lower than a predetermined speed, the control unit corrects the threshold to be higher than a value at a time when the closing speed is higher than the predetermined speed.

11. A robot manipulator comprising the grip apparatus according to claim 8 and a robot arm.

12. The grip apparatus according to claim 8, wherein the sensor is pressure sensitive conductive rubber.

13. A control method for a grip apparatus that includes a grip mechanism including a plurality of fingers, a sensor that is provided to at least one of the plurality of fingers and configured to output a detection signal corresponding to acting force, a cover member that covers the sensor, and a control unit configured to cause the plurality of fingers to perform an opening operation after performing a closing operation and to perform a closing operation after the opening operation, and also configured to determine that the grip mechanism grips a work in a case where a detection value based on the detection signal is higher than a threshold and determine that the grip mechanism releases the work in a case where the detection value is lower than the threshold, the method comprising:

executing a sampling of the detection signal of the sensor before the fingers contact the work and after the opening operation; and setting a value obtained by adding a predetermined value to the detection value based on the sampled detection signal as the threshold.

14. The control method for the grip apparatus according to claim 13, wherein the sampling of the detection signal is conducted at a time after the closing operation by the fingers is started but before the fingers contact the work.

15. The control method for the grip apparatus according to claim 13, wherein in a case where a speed of the closing operation is lower than a predetermined speed, the control unit corrects the threshold to be higher than a value at a time when the closing speed is higher than the predetermined speed.

16. The control method for the grip apparatus according to claim 13, wherein the sensor is pressure sensitive conductive rubber.

\* \* \* \* \*